United States Patent
Kwon et al.

(10) Patent No.: US 7,280,305 B2
(45) Date of Patent: Oct. 9, 2007

(54) METHOD AND APPARATUS FOR ESTIMATING AND CONTROLLING THE FLYING HEIGHT OF A READ-WRITE HEAD IN A HARD DISK DRIVE

(75) Inventors: Haesung Kwon, San Jose, CA (US); Vinod Sharma, Los Gatos, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/331,487

(22) Filed: Jan. 13, 2006

(65) Prior Publication Data

US 2007/0165323 A1   Jul. 19, 2007

(51) Int. Cl.
*G11B 21/02* (2006.01)

(52) U.S. Cl. .................................................. 360/75

(58) Field of Classification Search ............... None
See application file for complete search history.

(56) References Cited

U.S. PATENT DOCUMENTS

| | | | |
|---|---|---|---|
| 5,909,330 A | 6/1999 | Carlson et al. | |
| 6,191,901 B1 | 2/2001 | Carlson et al. | |
| 6,229,665 B1 | 5/2001 | Carlson et al. | |
| 6,268,976 B1 | 7/2001 | Carlson et al. | |
| 6,459,539 B1 | 10/2002 | Carlson et al. | |
| 6,577,466 B2 | 6/2003 | Meyer et al. | |
| 6,597,539 B1 | 7/2003 | Stupp et al. | |
| 6,707,646 B2 | 3/2004 | Berger et al. | |
| 6,717,776 B2 | 4/2004 | Boutaghou | |
| 6,876,509 B2 | 4/2005 | Bonin et al. | |
| 6,906,878 B2 | 6/2005 | Smith et al. | |
| 6,950,266 B1 | 9/2005 | McCaslin et al. | |
| 6,950,267 B1 | 9/2005 | Liu et al. | |
| 7,042,670 B2 | 5/2006 | Feng et al. | |
| 2001/0030822 A1* | 10/2001 | Boutaghou et al. | 360/25 |
| 2003/0026019 A1* | 2/2003 | Smith | 360/31 |
| 2004/0145824 A1 | 7/2004 | Lee | |
| 2005/0007687 A1* | 1/2005 | Feng et al. | 360/75 |
| 2005/0046985 A1 | 3/2005 | Morinaga et al. | |
| 2005/0088772 A1 | 4/2005 | Baumgart et al. | |
| 2005/0174665 A1* | 8/2005 | Zhang et al. | 360/25 |
| 2005/0264912 A1 | 12/2005 | Nikitlin et al. | |

* cited by examiner

*Primary Examiner*—Andrew L. Sniezek
(74) *Attorney, Agent, or Firm*—Earlr Jennings; GSS Law Group

(57) ABSTRACT

Method estimating flying height of read-write head in slider near rotating disk surface. Sensing leakage current between slider and spindle motor to create potential difference measurement. Converting potential difference measurement to create estimate of flying height. Method controlling flying height using method for estimating by adjusting vertical actuation signal to micro-actuator assembly. Embodiments implement these methods. Embedded circuit and hard disk drive, each including the apparatus. The invention includes methods of manufacturing and their products.

28 Claims, 12 Drawing Sheets

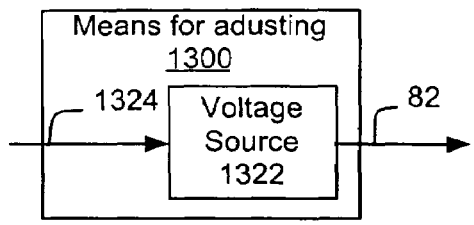
Fig. 8A
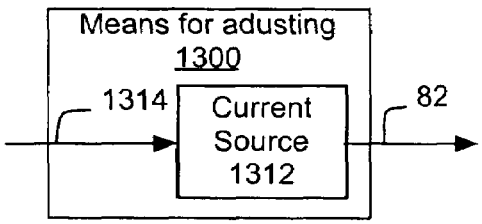
Fig. 8B
Fig. 8C
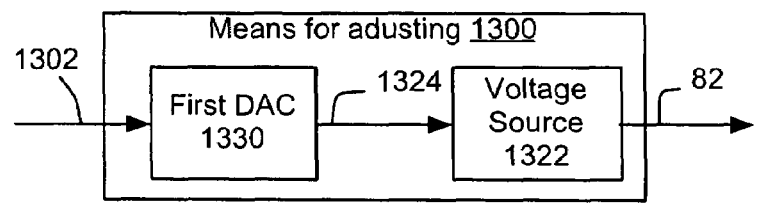
Fig. 8D
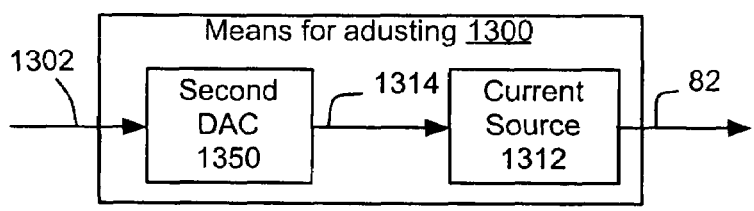
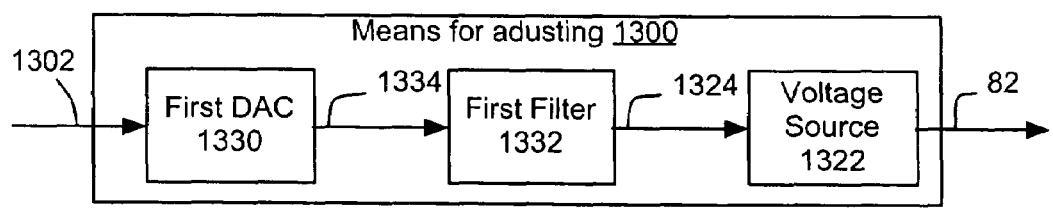
Fig. 8E
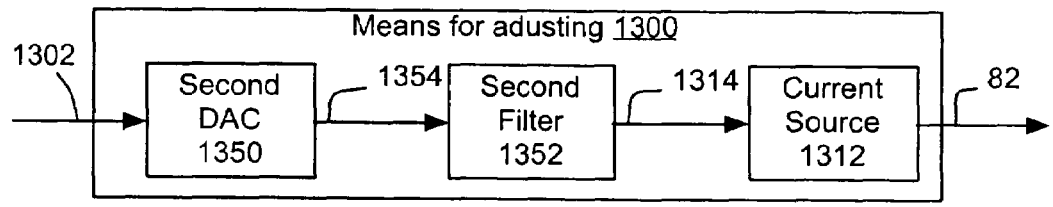
Fig. 8F

METHOD AND APPARATUS FOR ESTIMATING AND CONTROLLING THE FLYING HEIGHT OF A READ-WRITE HEAD IN A HARD DISK DRIVE

TECHNICAL FIELD

This invention relates to hard disk drive components, in particular, to methods and apparatus estimating the flying height of a read-write head near a rotating disk surface, and in certain embodiments, adjusting the flying height based upon the estimated flying height.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in positioning the slider close to the track.

When the slider is positioned close to the rotating disk surface, an air bearing forms, supporting the read write head at a flying height near the disk surface. The flying height is very small, often less than ten nanometers. This is an inherently dangerous situation. The slider can easily get too close or too far away from the rotating disk surface. These situations degrade the ability of the read-write head to access the data on rotating disk surface. In the case of collisions, the data being stored on the rotating disk surface and/or the read-write head may be damaged.

Methods and apparatus are needed to estimate the flying height of the read-write head near the rotating disk surface. Methods and apparatus are further needed to adjust the flying height based upon the estimated flying height.

SUMMARY OF THE INVENTION

The invention includes a method for estimating the flying height of a read-write head in a slider near a rotating disk surface included in a hard disk drive. The method includes the following. Sensing a leakage current between the slider and a spindle motor electrically coupling through a spindle to the rotating disk surface to create a potential difference measurement. And converting the potential difference measurement to create an estimate of the flying height of the read-write head near the rotating disk surface.

The invention includes a method of controlling the flying height using the method for estimating that flying height, by adjusting a vertical actuation signal to a micro-actuator assembly coupled to the slider based upon the estimate of the flying height. The micro-actuator assembly, stimulated by the vertical actuations signal, acts upon the slider to at least partly control the flying height.

Certain embodiments implement this method of controlling the flying height, by including a means for adjusting the vertical actuation signal to the micro-actuator assembly. The means for adjusting may include a voltage source driven by a voltage control signal to, at least partly, create the vertical actuation signal, or a current source driven by a current control signal to, at least partly, create the vertical actuation signal.

The apparatus may further include a servo controller providing the digital vertical control signal. The servo controller may preferably further provide the digital vertical control signal based upon the estimate of the flying height of the read-write head. It may further provide the digital vertical control signal based upon the estimate of the ambient temperature and/or the estimate of the air pressure within the hard disk drive.

The servo controller may preferably include a servo computer accessibly coupled to a servo memory containing at least one program step included in a servo program system. The servo program system may preferably include the following program steps. Converting the potential difference measurement to create the estimate of the flying height of the read-write head. And adjusting the vertical actuation signal based upon the estimate of the flying height. Adjusting the vertical actuation signal may further include adjusting the digital vertical control signal based upon the estimate of the flying height.

The invention's apparatus implementing the method for estimating the flying height may include the following. Means for sensing the leakage current between the slider and the spindle motor electrically coupling through the spindle to the rotating disk surface to create the potential difference measurement. And means for converting the potential difference measurement to create the estimate of the flying height of the read-write head near the rotating disk surface. The servo computer may preferably receive the potential difference measurement from a means for sensing the leakage current between the slider and the spindle motor.

Certain embodiments of the apparatus implementing the control method include the servo computer communicatively coupled to an analog to digital converter sensing a potential difference across a resistor to create the potential difference measurement in the servo memory. The resistor electrically couples to the slider and to the spindle motor, which electrically couples through the spindle to the rotating disk surface near the read-write head of the slider the apparatus may further includes the servo computer providing a digital vertical control signal to a digital control voltage source to create the vertical actuation signal, or the servo computer providing the digital vertical control signal to a digital control current source to create the vertical actuation signal. The servo program system may include program steps supporting the following. Converting the potential difference measurement to create the estimate of the flying height. And adjusting the digital vertical control signal based upon the estimate of the flying height.

Apparatus implementing the method of estimating the flying height may include the following. Means for sensing the leakage current between the slider and the spindle motor electrically coupling through the spindle to the rotating disk surface to create the potential difference measurement. And means for converting the potential difference measurement to create the estimate of the flying height of the read-write head near the rotating disk surface.

The invention includes an embedded circuit and a hard disk drive, each including the apparatus for estimating the flying height. The embedded circuit and/or the hard disk drive may further include the means for adjusting the flying height.

Alternatively, the embedded circuit and/or the hard disk drive may include a servo controller with a servo computer providing a digital vertical control signal to the digital control voltage source or to the digital control current source. The servo computer may communicatively couple to the analog to digital converter sensing the potential difference across the resistor.

The invention includes methods of manufacturing and their products. Providing the means for sensing the leakage current and providing the means for converting create the apparatus for estimating the flying height. The apparatus is used to create the hard disk drive by electrically coupling the means for sensing to the slider and to the spindle motor. The spindle motor may be mounted on a disk base. Alternatively, the spindle motor may be embedded in the disk base.

BRIEF DESCRIPTION OF THE DRAWINGS

FIGS. 8A to 8F shows various examples of the means for adjusting of FIGS. 1 and 2;

DETAILED DESCRIPTION

Figure 1:
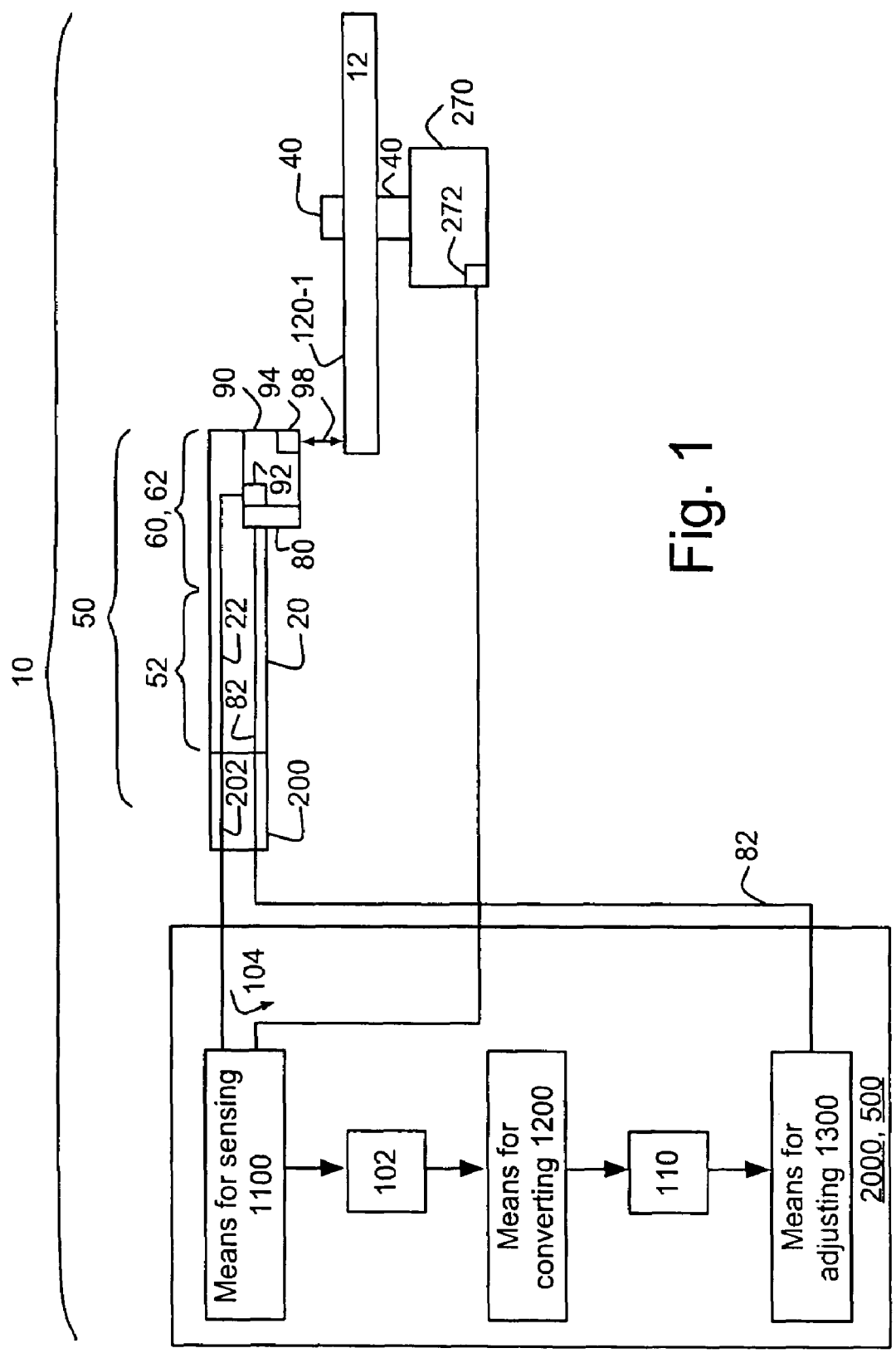
FIGS. 1 to 3B show certain aspects of the invention's method and apparatus for estimating the flying height of a read-write head near a rotating disk surface.

This invention relates to hard disk drive components, in particular, to methods and apparatus estimating the flying height of a read-write head near a rotating disk surface, and in certain embodiments, adjusting the flying height based upon the estimated flying height. The invention includes a method for estimating the flying height of a read-write head in a slider near a rotating disk surface included in a hard disk drive.

Various aspects and examples of estimating the flying height 98 of a read-write head 94 in a slider 90 near a rotating disk surface 120-1 included in a hard disk drive 10 are shown in FIGS. 1 to 5A and 7. The method includes the following. Sensing a leakage current 104 between the slider 90 and a spindle motor 270 electrically coupling through a spindle 40 to the rotating disk surface to create a potential difference measurement 102. And converting the potential difference measurement 102 to create an estimate of the flying height 110 of the read-write head near the rotating disk surface.

Figure 2:
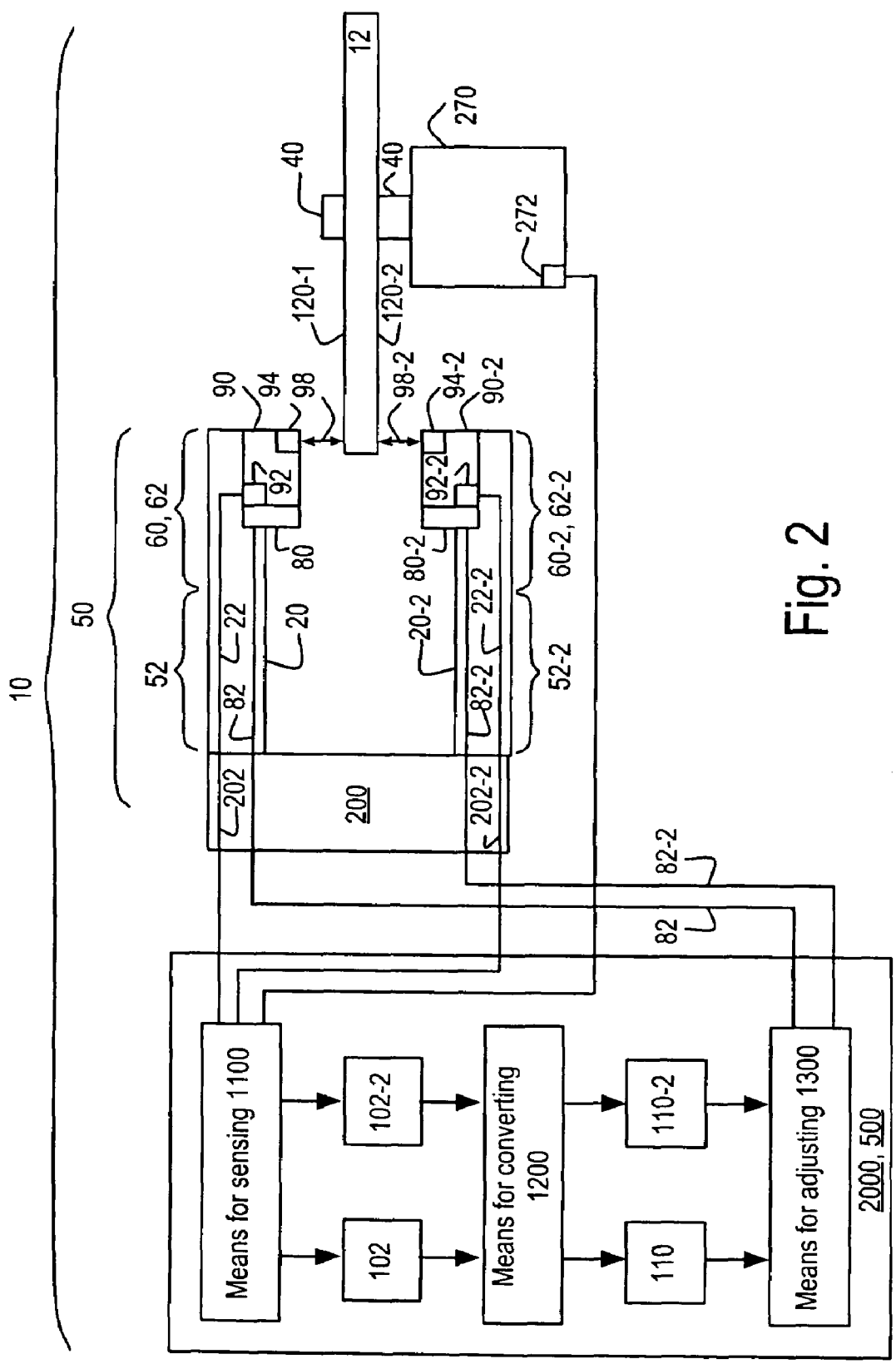

When the hard disk drive 10 includes a second read-write head 94-2 in a second slider 90-2 near a second rotating disk surface 120-2 at a second flying height 98-2, the method may further, preferably include the following. Sensing a second leakage current 104-2 between the second slider 90-2 and the spindle motor 270 electrically coupling through the spindle 40 to the second rotating disk surface to create a second potential difference measurement 102-2 as shown in FIG. 2. And converting the second potential difference measurement 102-2 to create a second estimate of a second flying height 110-2 of the second read-write head near the second rotating disk surface.

Figure 3A:
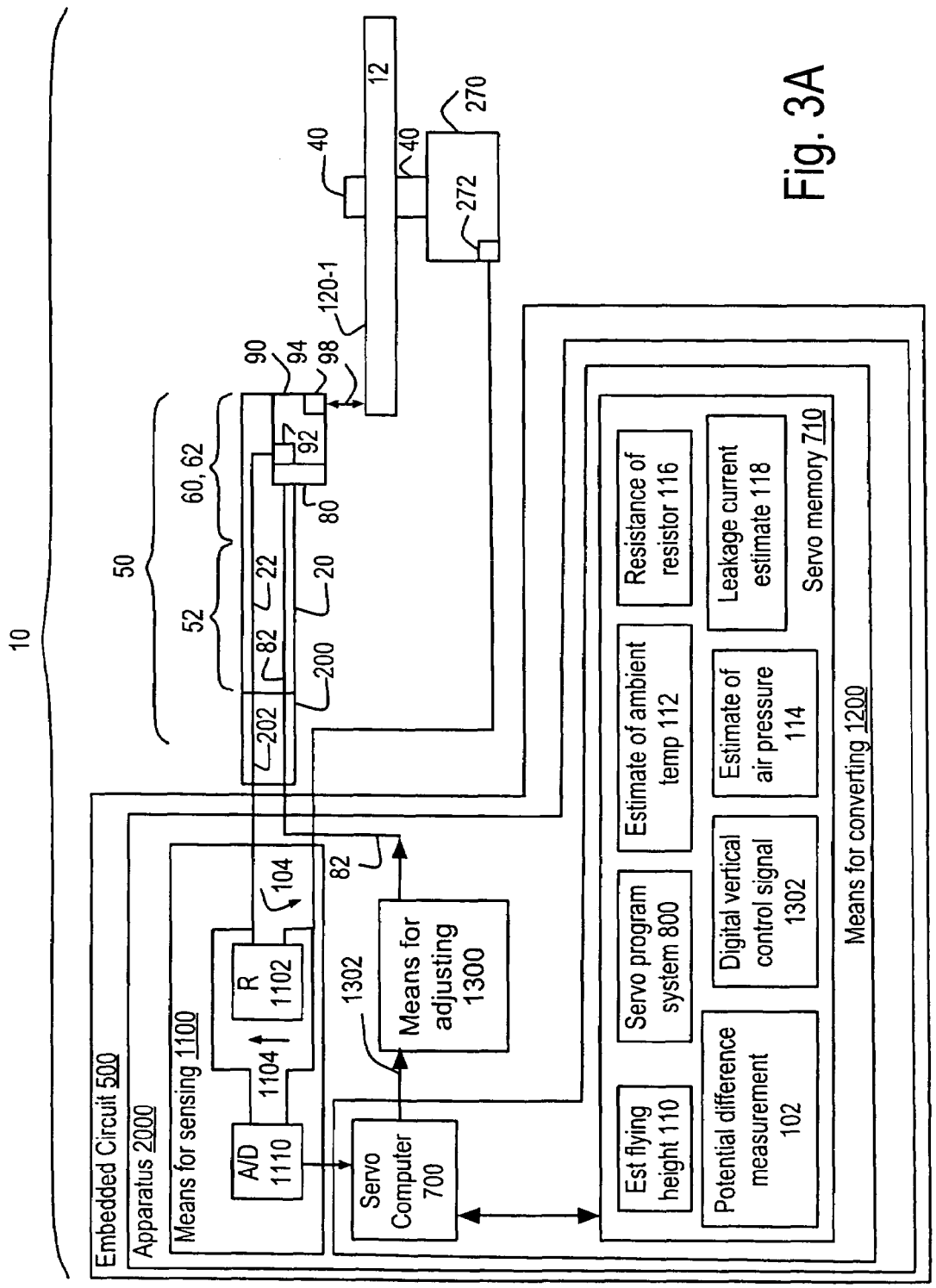

Converting the potential difference measurement 102 may be based upon an estimate of the ambient temperature 112 and/or upon an estimate of the air pressure 114 within the hard disk drive 10 to create the estimate of the flying height 110, as shown in FIG. 3A.

The invention includes a method of controlling the flying height 98 using the method for estimating that flying height. A vertical actuation signal 82 to a micro-actuator assembly 80 coupled to the slider 90 is adjusted based upon the estimate of the flying height 110, as shown in FIG. 1 to 3A. The micro-actuator assembly, stimulated by the vertical actuation signal, acts upon the slider to at least partly control the flying height.

Certain embodiments implement this method of controlling the flying height as apparatus 2000, by including a means for adjusting 1300 the vertical actuation signal 82 to the micro-actuator assembly 80, as shown in FIGS. 1, 2, and 8A to 8F. The means for adjusting may include a voltage source 1322 driven by a voltage control signal 1324 to, at least partly, create the vertical actuation signal 82, shown in FIGS. 8A, 8C, and 8E. Alternatively, the means for adjusting may include a current source 1312 driven by a current control signal 1314 to, at least partly, create the vertical actuation signal, as shown in FIGS. 8B, 8D, and 8F.

The means for adjusting 1300 may further include a digital vertical control signal 1302 driving a first Digital to Analog Converter 1330 (DAC) at least partly generating the voltage control signal 1324, shown in FIGS. 8C and 8E. Alternatively, the means for adjusting may further include the digital vertical control signal driving a second DAC 1350 at least partly generating the current control signal 1314, as shown in FIGS. 8D and 8F.

The means for adjusting 1300 may further include a first filter 1332 electrically coupled to a first output 1334 of the first DAC 1330 to create the voltage control signal 1324, shown in FIG. 8E. Alternatively, the means for adjusting may further include a second filter 1352 electrically coupled to a second output 1354 of the second DAC 1350 to create the voltage control signal 1324, shown in FIG. 8F.

The apparatus 2000 may further include a servo controller 600 providing the digital vertical control signal 1302, as in FIG. 3A. The servo controller may preferably further provide the digital vertical control signal based upon the estimate of the flying height 110 of the read-write head 94. It may further provide the digital vertical control signal based upon the estimate of the ambient temperature 112 and/or the estimate of the air pressure 114 within the hard disk drive 10.

The Figures include flowcharts of at least one method of the invention possessing arrows with reference numbers. These arrows will signify of flow of control and sometimes data, supporting implementations including at least one program step or program thread executing upon a computer, inferential links in an inferential engine, state transitions in a finite state machine, and learned responses within a neural network.

The step of starting a flowchart refers to at least one of the following and is denoted by an oval with the text "Start" in it. Entering a subroutine in a macro instruction sequence in a computer. Entering into a deeper node of an inferential graph. Directing a state transition in a finite state machine, possibly while pushing a return state. And triggering at least one neuron in a neural network.

The step of termination in a flowchart refers to at least one of the following and is denoted by an oval with the text "Exit" in it. The completion of those steps, which may result in a subroutine return, traversal of a higher node in an inferential graph, popping of a previously stored state in a finite state machine, return to dormancy of the firing neurons of the neural network.

A step in a flowchart refers to at least one of the following. The instruction processor responds to the step as a program step to control the data execution unit in at least partly implementing the step. The inferential engine responds to the step as nodes and transitions within an inferential graph based upon and modifying a inference database in at least partly implementing the step. The neural network responds to the step as stimulus in at least partly implementing the step. The finite state machine responds to the step as at least one member of a finite state collection comprising a state and a state transition, implementing at least part of the step.

Several flowcharts include multiple steps. In certain aspects, any one of the steps may be found in an embodiment of the invention. In other aspects, multiple steps are needed in an embodiment of the invention. When multiple steps are needed, these steps may be performed concurrently, sequentially and/or in a combination of concurrent and sequential operations. The shapes of the arrows in multiple step flowcharts may differ from one flowchart to another, and are not to be construed as having intrinsic meaning in interpreting the concurrency of the steps.

Figure 3B:
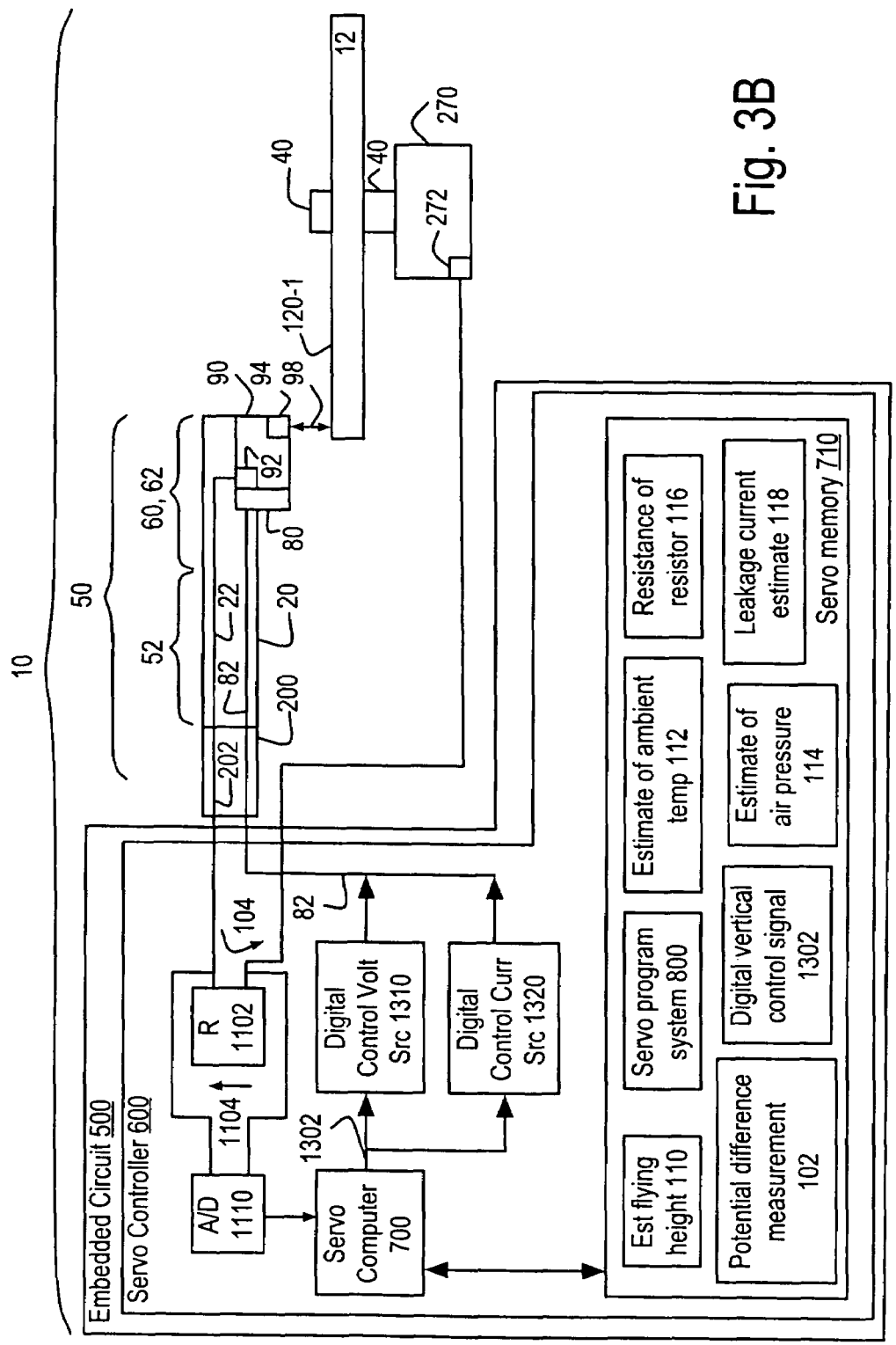
Figure 10A:
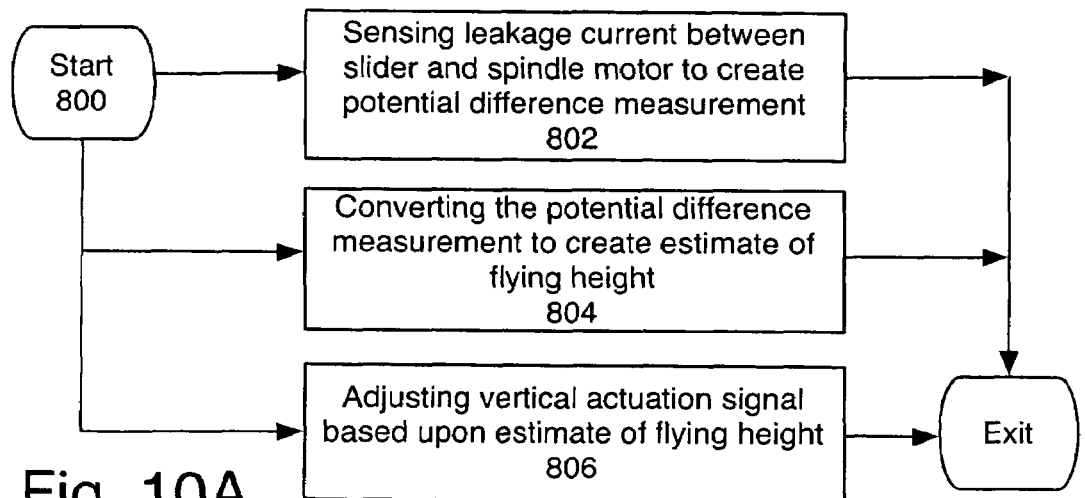
FIGS. 10A to 11B show flowcharts relating to the program system of FIGS. 3A and 3B.

The servo controller 600 may preferably include a servo computer 700 accessibly coupled 702 to a servo memory 710 containing at least one program step included in a servo program system 800, as shown in FIG. 3B. The servo program system may preferably include the following program steps, as shown in FIG. 10A. Operation 802 supports sensing the leakage current 104 between the slider 90 and the spindle motor 270 to create the potential difference measurement 102. Operation 804 supports converting the potential difference measurement to create the estimate of the flying height 110 of the read-write head 94. And operation 806 supports adjusting the vertical actuation signal 82 based upon the estimate of the flying height. Certain embodiments of the invention may not require operation 802.

Figure 9E:
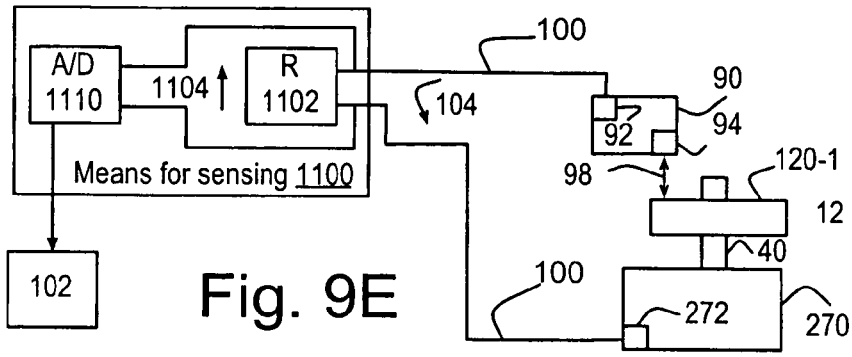
FIG. 9E shows an example of the means for sensing of FIGS. 1 and 2.
Figure 10B:
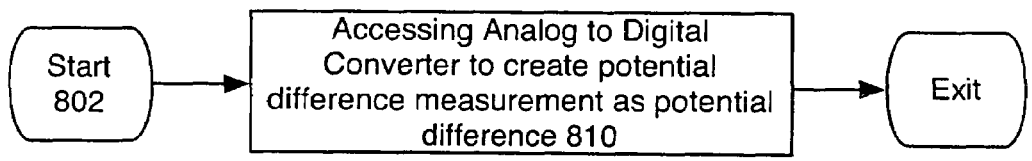

FIG. 10B shows a refinement of operation 802 of FIG. 10A. Operation 810 supports sensing the leakage current 104 by accessing an Analog to Digital converter 1110 to create the potential difference measurement 102. The Analog to Digital converter is preferably coupled across the resistor 1102, as shown in FIGS. 3A, 3B, and 9E.

Figure 10C:
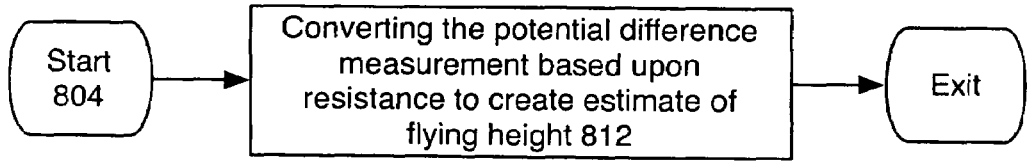
Figure 10D:
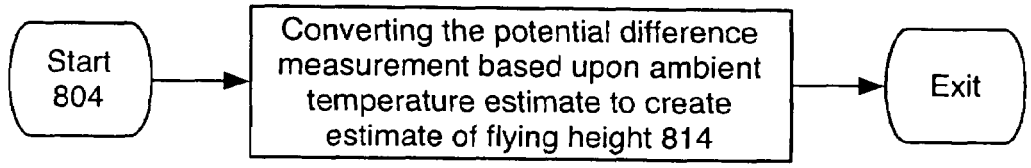
Figure 10E:
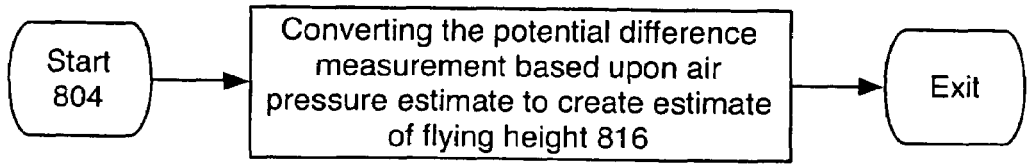

FIGS. 10C to 10E show some examples of refinements of operation 804 of FIG. 10A, creating the estimate of the flying height 110. Operation 812 supports converting the potential difference measurement 102 based upon the resistance 116 of the resistor 1102 to create the estimate of the flying height. Operation 814 supports converting the potential difference measurement based upon an estimate of the ambient temperature 112 within the hard disk drive 10. And operation 816 supports converting the potential difference measurement based upon an estimate of the air pressure 114 within the hard disk drive.

Various embodiments of the invention may use versions of any one or a combination of these operations. By way of example, the resistance 116 of the resistor 1102 may be used in terms of its multiplicative inverse, allowing a leakage current estimate 118 to be calculated as the potential difference measurement multiplied by the multiplicative inverse of the resistance of the resistor. An example of this approach is shown in FIG. 11B. Operation 822 supports calculating the leakage current estimate based upon the potential difference measure and the resistance, preferably stored as the multiplicative inverse. Operation 824 supports determining the estimate of the flying height 110 from the leakage current estimate.

The invention includes many approaches to implementing operation 824 of FIG. 11B, in specific, and operation 804 of FIGS. 10A and 10C to 10E in general. One approach is to use a formula to determine the estimate of the flying height 110. Another approach is to use a fuzzy logic inference network. Another approach is to use a table.

Figure 11A:
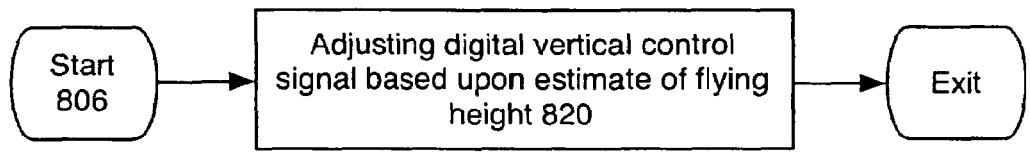
FIG. 11C shows some details of the means for converting of FIGS. 1 to 3A.
FIG. 11D shows the spindle motor embedded in the disk base.
Figure 11B:
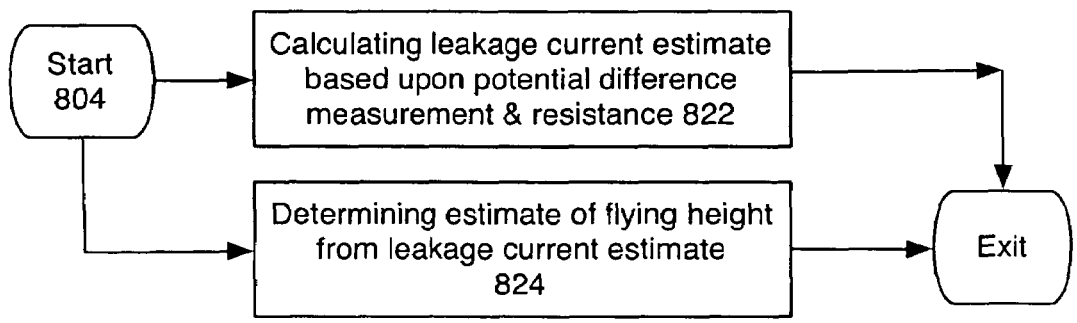

FIG. 11A shows a refinement of operation 806 of FIG. 10A. Operation 820 supports adjusting the vertical actuation signal 82 may further include adjusting the digital vertical control signal 1302 based upon the estimate of the flying height 110.

The invention's apparatus 2000 implementing the method for estimating the flying height 98 may include the following. Means for sensing 1100 the leakage current 104 between the slider 90 and the spindle motor 270 electrically coupling through the spindle 40 to the rotating disk surface 120-1 to create the potential difference measurement 102, as shown in FIGS. 1 and 2. And means for converting 1200 the potential difference measurement 102 to create the estimate of the flying height 110 of the read-write head 94 near the rotating disk surface. The servo computer 700 may preferably receive the potential difference measurement 102 from a means for sensing 1100 the leakage current between the slider and the spindle motor, as shown in FIG. 3B.

Certain embodiments of the apparatus 2000 implementing the control method may include the following. A servo computer 700 communicatively coupled 1112 to an analog to digital converter 1110 sensing a potential difference 1104 across a resistor 1102 to create the potential difference measurement 102 in the servo memory 710, as shown in FIG. 3A. The resistor electrically couples to the slider 90 and to the spindle motor 270, which electrically couples through the spindle 40 to the rotating disk surface 120-1 near the read-write head 94 of the slider.

The apparatus 2000 may further include the servo computer providing a digital vertical control signal 1302 to a digital control voltage source 1320 to create the vertical actuation signal 82. Alternatively, the servo computer may provide the digital vertical control signal to a digital control current source 1310 to create the vertical actuation signal 82.

Figure 9A:
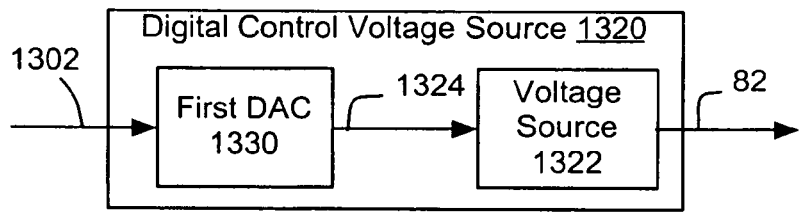
FIG. 9A and 9C show various examples of the digital control voltage source of FIG. 3A.

The digital control voltage source 1320 may include a first Digital to Analog Converter 1330 (DAC) driven by the digital vertical control signal 1302 to, at least partly, create a voltage control signal 1324 presented to a voltage source 1322 to, at least partly, create the vertical actuation signal 82, as in FIG. 9A. It may further include the first DAC 1330 creating a first output 1334 presented to a first filter 1332 to, at least partly, create the voltage control signal presented to the voltage source, as in FIG. 9C.

Figure 9B:
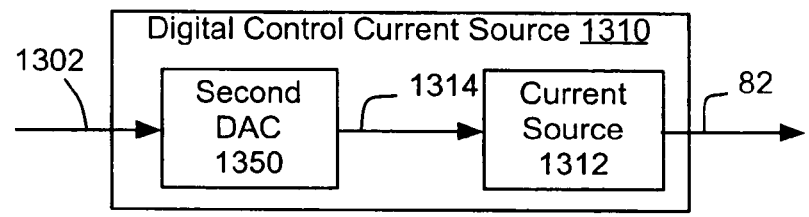
FIGS. 9B and 9D show various examples of the digital control current source of FIG. 3A.
Figure 9C:
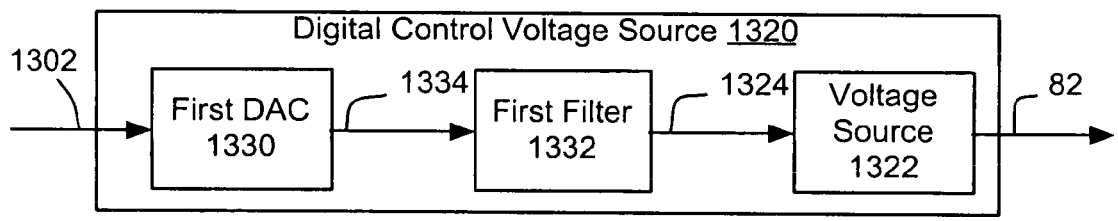
Figure 9D:
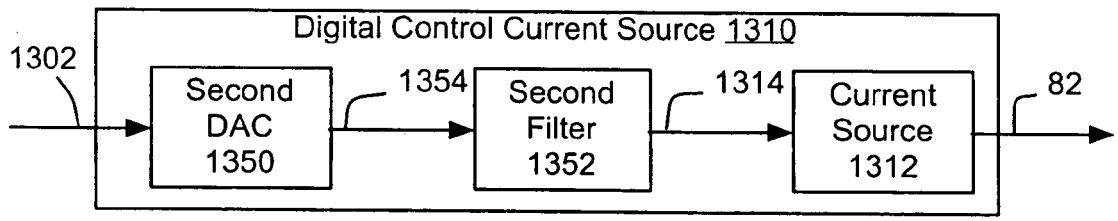

The digital control current source 1310 may include a second DAC 1350 driven by the digital vertical control signal 1302 to, at least partly, create a current control signal 1314 presented to a current source 1312 to, at least partly, create the vertical actuation signal 82, as in FIG. 9B. It may further include the second DAC 1350 creating a second output 1354 presented to a second filter 1352 to, at least partly, create the current control signal 1314 presented to the current source 1312, as in FIG. 9D.

As used herein a computer may include at least one instruction processor and at least one data processor, where at least one of the instruction processors directs the data processor, for each of the data processors.

Apparatus 2000 implementing the method of estimating the flying height 98 may include the following as shown in FIGS. 1 and 2. Means for sensing 1100 the leakage current 104 between the slider 90 and the spindle motor 270 electrically coupling through the spindle 40 to the rotating disk surface 120-1 to create the potential difference measurement 102. And means for converting 1200 the potential difference measurement to create the estimate of the flying height 110 of the read-write head 94 near the rotating disk surface 120-1.

The means for sensing 1100 may preferably include a resistor 1102 coupling between the slider 90 and the spindle motor 270 to create a leakage current path 100, and an analog to digital converter 1110 coupling across the resistor 1102 to create the potential difference measurement 102 as a potential difference 1104, as shown in FIG. 9E. The potential difference may be at least one micro-volt and/or the resistor may have a resistance of at least one mega-ohm.

Figure 11C:
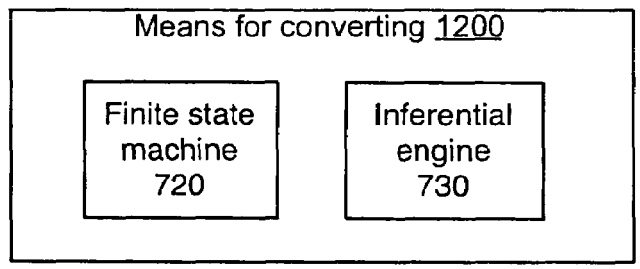

The means for converting 1200 may preferably convert the potential difference measurement 102 based upon the resistance 116 of the resistor 1102, as shown in FIG. 3A. The means for converting may include at least one finite state machine 720, a servo computer 700 accessibly coupled 702 to a servo memory 710 containing at least one program step included in a servo program system 800, and an inferential engine 730 as shown in FIG. 3A, 3B, and 11C. As used herein, a memory may include a volatile memory component and/or a non-volatile memory component. A volatile memory component tends to lose its memory contents unless supplied power on a regular, often continuous, basis. A non-volatile memory component retains its memory contents without needing to be supplied power.

The invention includes an embedded circuit 500 and the hard disk drive 10, each including the apparatus 2000 for estimating the flying height 98. The embedded circuit and/or the hard disk drive may further include the means for adjusting 1300 the flying height, as shown in FIGS. 1 to 3A and 7.

Alternatively, the embedded circuit 500 and/or the hard disk drive 10 may include a servo controller 600 with a servo computer 700 providing a digital vertical control signal 1302 to the digital control voltage source 1320 or to the digital control current source 1310, as shown in FIG. 3B. The servo computer may communicatively couple 1112 to the analog to digital converter 1110 sensing the potential difference 1104 across the resistor 1102.

Figure 7:
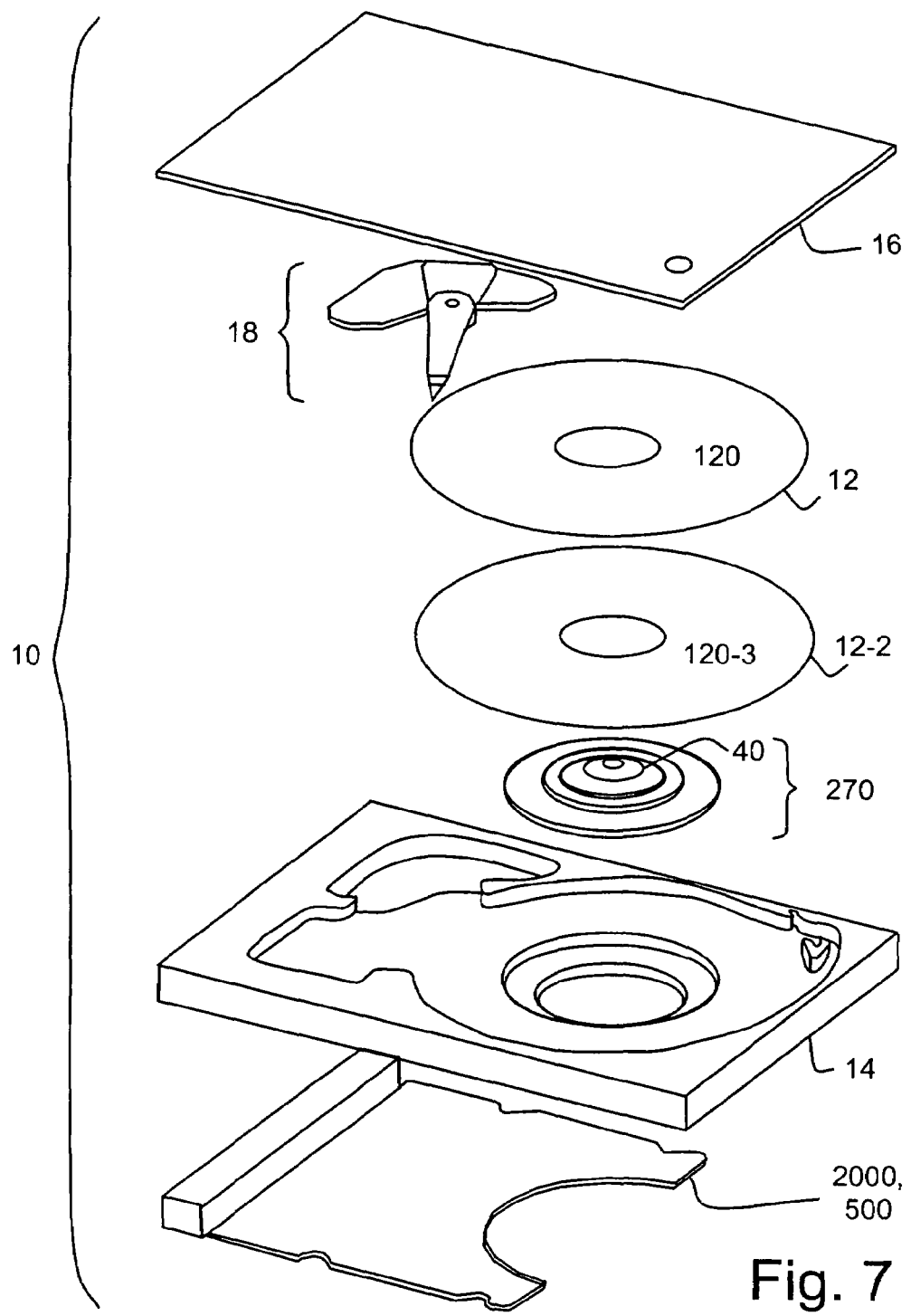
FIG. 7 shows an exploded view of the hard disk drive of FIGS. 1 to 3 and 5A including the embedded circuit.
Figure 11D:
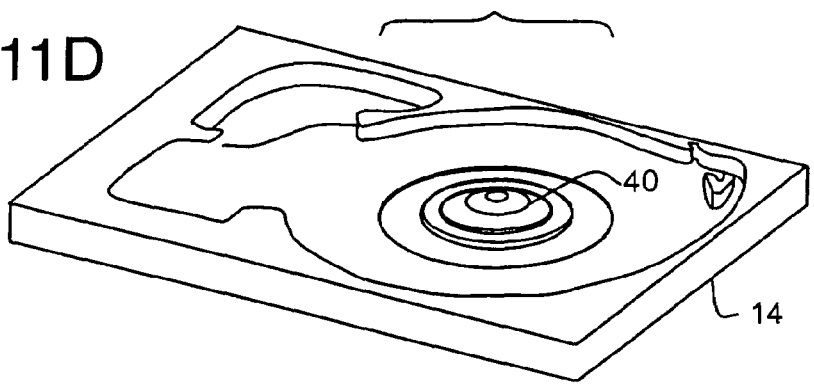

The invention includes methods of manufacturing and their products. Providing the means for sensing 1100 the leakage current 104 and providing the means for converting 1200 create the apparatus 2000 for estimating the flying height. The apparatus is used to create the hard disk drive 10 by electrically coupling the means for sensing to the slider 90 and to the spindle motor 270. The spindle motor may be mounted on a disk base 14, as shown in FIG. 7. Alternatively, the spindle motor may be embedded in the disk base, as shown in FIG. 11D.

The invention includes a slider, a flexure finger, a head suspension assembly, a head gimbal assembly, a main flex circuit, an actuator assembly, the spindle motor, the embedded circuit, and the hard disk drive. The slider includes a terminal for use in measuring the leakage current. The terminal may preferably be electrically coupled to a metallic layer of the slider. The flexure finger for use with the slider includes a signal path for electrically coupling to the terminal. The head suspension assembly includes the flexure finger coupling to a load beam.

Figure 6:
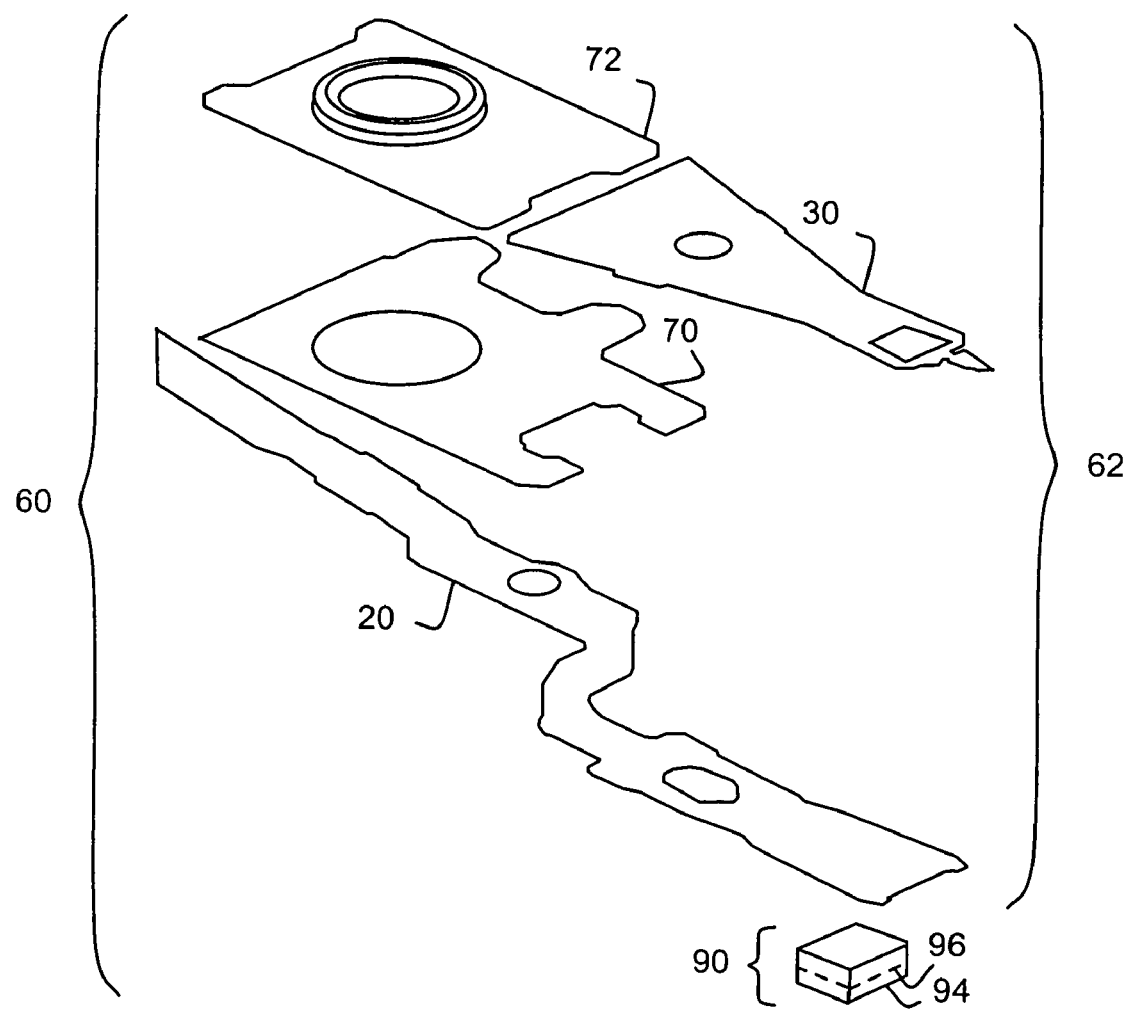

The invention includes a slider 90 comprising a terminal 92 for use in measuring the leakage current 104, as shown in FIGS. 1 to 4. The terminal may preferably be electrically coupled to a metallic layer 96 of the slider, as shown in FIG. 6. The terminal may be situated away from the read-write head 94 also included in the slider. Manufacturing the slider includes manufacturing the terminal. The slider is a product of this process.

The invention includes a flexure finger 20 for use with the slider 90. The flexure finger includes a signal path 22 for electrically coupling to the terminal 92, as shown in FIGS. 1 to 4. Manufacturing the flexure finger includes forming the signal path. The flexure finger is a product of this process.

The invention includes a head suspension assembly 62. The head suspension assembly includes the flexure finger 20 coupling to a load beam 30, as shown in FIG. 6. Manufacturing the head suspension assembly couples the flexure finger to the load beam to create the head suspension assembly. The head suspension assembly is the product of this process.

The head suspension assembly 62 of FIG. 6 includes the load beam 30, a hinge 70 and the base plate 72. The manufacturing of the head suspension assembly includes attaching the load beam to the hinge. The hinge is attached to the base plate.

The invention includes a head gimbal assembly 60. The head gimbal assembly includes the head suspension assembly 62 coupling to the slider 90 by electrically coupling the terminal 92 to the signal path 22 included in the flexure finger 20, as shown in FIGS. 1 to 4 and 5B. Manufacturing the head gimbal assembly includes coupling the head suspension assembly to the slider by electrically coupling the terminal to the signal path. The head gimbal assembly is a product of this process.

The head gimbal assembly 60 may further, preferably, include a micro-actuator assembly 80 coupling to the slider 90 and electrically coupling to a vertical actuation signal 82, as shown in FIGS. 1 to 4 and 5B. The micro-actuator assembly, stimulated by the vertical actuation signal, acts upon the slider to at least partly control the flying height 98. As used herein, the micro-actuator assembly may employ any combination of piezoelectric and electrostatic effects to alter the flying height.

A head gimbal assembly 60 further includes the head suspension assembly 62, a slider 90, connected electrically and mechanically to a flexure finger 20. The flexure finger is attached to at least the load beam 30. The slider includes the read-write head 94, which is embedded in it, forming an air-bearing surface for flying a few nano-meters off the rotating disk surface 120-1 during normal access operations of the hard disk drive 10.

The invention includes an actuator assembly 50. The actuator assembly includes at least one actuator arm 52 coupled to at least one head gimbal assembly 60, as shown in FIGS. 1 and 3A. Manufacturing the actuator assembly includes coupling at least one of the head gimbal assemblies to the actuator arm. The actuator assembly is a product of this process.

Figure 4:
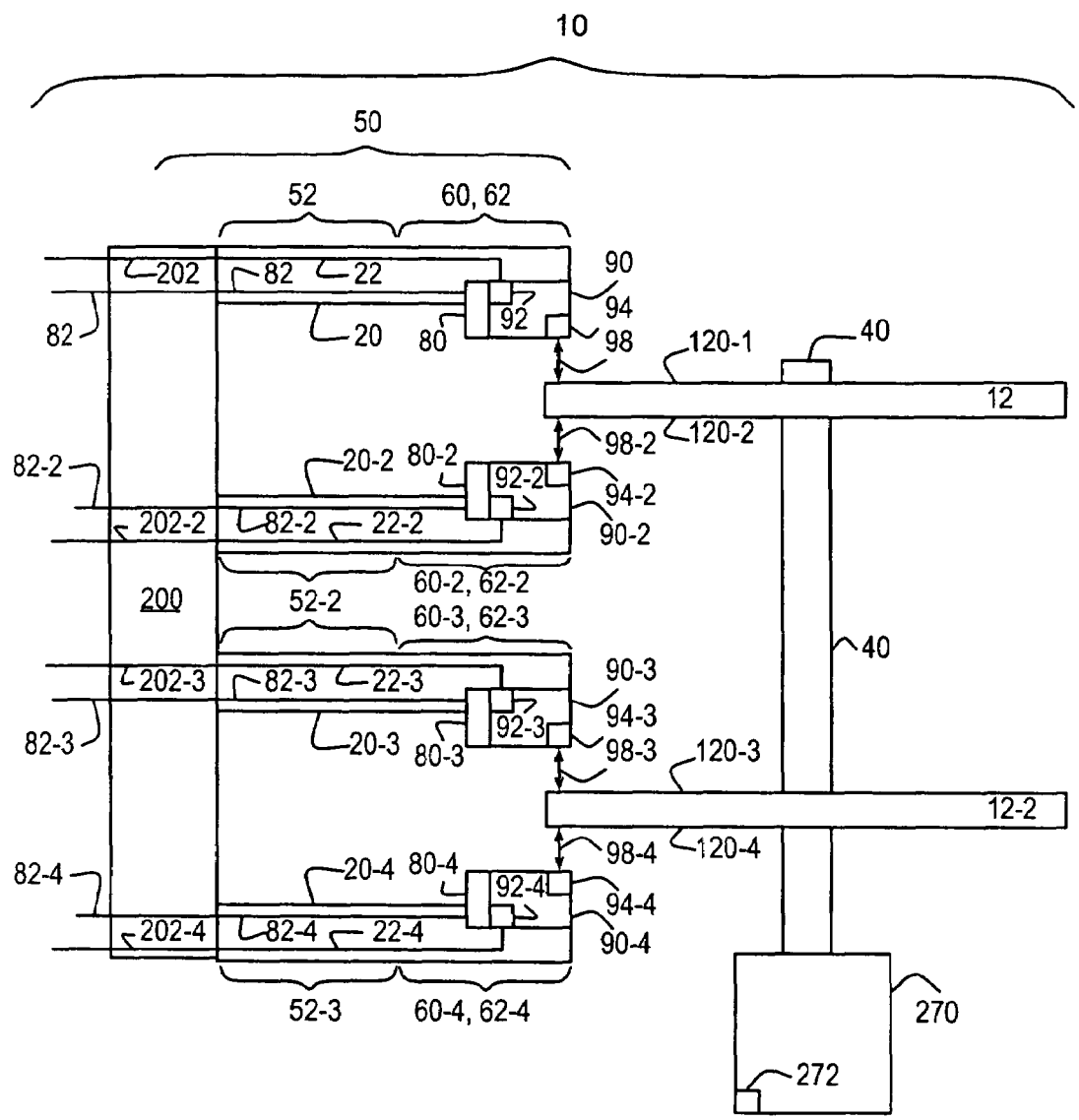
FIG. 4 shows the actuator assembly of the previous Figures including an actuator arm coupled to two of the invention's head gimbal assemblies.

The actuator assembly may include at least two actuator arms, as shown in FIGS. 2 and 4. At least one of the actuator arms 52-2 may be coupled to two of the head gimbal assemblies, 60-2 and 60-3, as shown in FIG. 4. By way of example, the second actuator arm 52-2 may preferably couple to the second head gimbal assembly 60-2 and the third head gimbal assembly 60-3. Such an actuator arm may be preferred to minimize manufacturing expense. The second actuator arm preferably accesses two rotating disk surfaces (which are not shown) and may further improve the overall reliability of the hard disk drive 10.

The actuator assembly 50 may further include a main flex circuit 200, as shown in FIGS. 1 to 3 and 5A. The main flex circuit may include a main flex signal path 202 electrically coupled to the signal path 22 of at least one flexure finger 20. The main flex circuit may include a main flex signal path electrically coupled to the signal path of the flexure finger included in each head gimbal assembly 60, as shown in FIGS. 1 to 3A. The main flex circuit and the at least one coupled flexure finger may be separately manufactured, or manufactured as a single flex circuit.

Each actuator arm 52 attaches to at least one head gimbal assembly 60, as shown in FIGS. 1 to 4. In certain preferred embodiments of the invention, the base plate 80 of the head gimbal assembly 60 provides the top layer coupling the actuator arm to the head gimbal assembly.

Figure 5A:
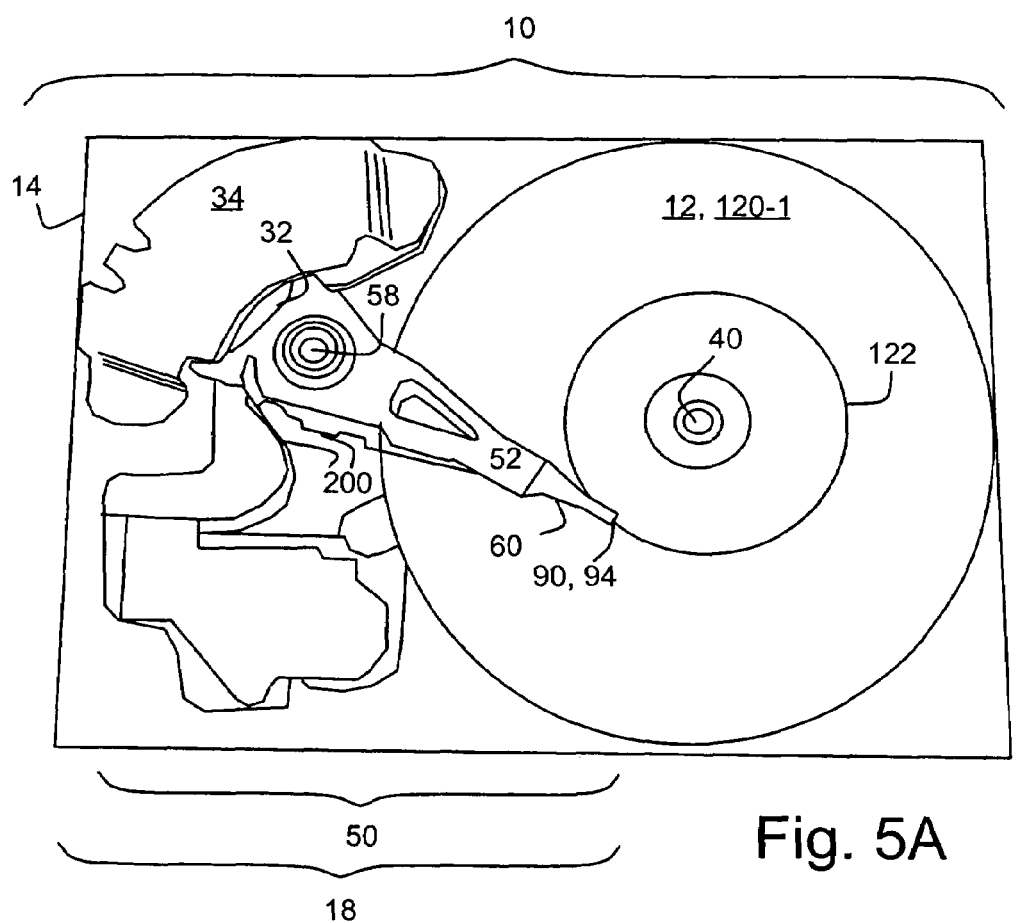
FIG. 5A shows a view of a partially assembled version of the hard disk drive of FIGS. 1 to 3.
Figure 5B:
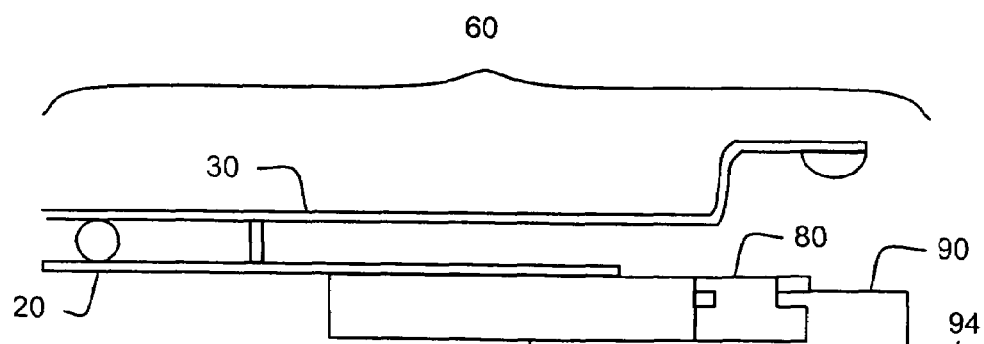
FIGS. 5B and 6 show a views of the head gimbal assembly of the previous Figures.

The invention's hard disk drive 10 may include the actuator assembly 50 pivotably coupled to a disk base 14, as shown in FIG. 5A. Manufacturing the hard disk drive may include pivotably mounting the actuator assembly to the disk base. The hard disk drive is a product of this process. The hard disk drive may further preferably include the spindle motor 270 coupled to the disk base and providing a second terminal 272 for use in measuring the leakage current 104. The spindle motor may be embedded in the disk base as shown in FIG. 11D, or mounted on the disk base as shown in FIG. 6.

The hard disk drive 10 may further preferably include the spindle motor 270 electrically coupling through the spindle 40 to at least one rotating disk surface 120-1. The hard disk drive may further, preferably include the embedded circuit 500 electrically coupling to the terminal 92 and to the second terminal 272 to implement the invention's method of estimating the flying height 98 of the read-write head 94 in the slider 90 near the rotating disk surface.

FIG. 5A shows a partially assembled hard disk drive 10 including the head gimbal assembly 60 coupled with an actuator arm 52, included in a voice coil motor 18. The voice coil motor includes an actuator assembly 50, which includes the head gimbal assembly 60.

A disk 12 is shown rotating about spindle 40 to create the rotating disk surface 120-1. The actuator assembly 50 pivots about the actuator pivot 58. The actuator assembly includes the actuator arm 52 coupled with the voice coil 32. When the voice coil is electrically stimulated with a time-varying electrical signal, it inductively interacts with a fixed magnet 34 attached to the voice coil yoke, causing the actuator arm to pivot by lever action through the actuator pivot. Typically, the fixed magnet is composed of two parts, one attached to the voice coil yoke and the other attached to the bottom voice coil yoke. As the actuator arm pivots, the head gimbal assembly 60 is moved across the disk surface 12-1. This provides the coarse positioning of the slider 90, and consequently, the read-write head 100 over a specific track 122.

FIG. 7 shows an exploded view of the primary components of the hard disk drive 10 including the voice coil motor 18. The hard disk drive further includes a disk base 14 to which the actuator assembly 50 is preferably mounted. The spindle motor 270 preferably drives the disk 12, and consequently the disk surface through the spindle 40, which in normal operation creates the rotating disk surface 120-1. The hard disk drive may further include a second rotating disk surface, as shown in FIGS. 2 and 4, to which a second actuator arm 52-2 may position a second head gimbal assembly 60-2. An embedded circuit 500 is used to control the positioning of the read-write head 94, possibly by also using a micro-actuator assembly 80, as well as the coarse positioning through the interactions with the voice coil 32, the fixed magnet 34 and the actuator arm 52 of the actuator assembly 50.

The preceding embodiments provide examples of the invention and are not meant to constrain the scope of the following claims.

What is claimed is:

1. A method, comprising the step of:
   estimating the flying height of a read-write head in a slider near a rotating disk surface included in a hard disk drive, comprising the steps:
   sensing a leakage current between said slider and a spindle motor electrically coupling through a spindle to said rotating disk surface to create a potential difference measurement; and
   converting said potential difference measurement to create an estimate of said flying height of said read-write head near said rotating disk surface, further comprises the step:
   converting said potential difference measurement based upon an ambient temperature estimate within said hard disk drive to create said estimate of said flying height.

2. The method of claim 1, wherein said hard disk drive includes a second of said read-write heads in a second of said sliders near a second of said rotating disk surfaces;
   wherein said method, further comprises the steps:
   sensing a second of said leakage currents between said second slider and said spindle motor electrically coupling through said spindle to said second rotating disk surface to create a second of said potential difference measurements; and
   converting said second of said potential difference measurement to create a second estimate of a second flying height of said second read-write head near said second rotating disk surface.

3. The method of claim 1, wherein the step converting said potential difference measurement, further comprises the step:
   converting said potential difference measurement based upon said ambient temperature estimate and upon an air pressure estimate within said hard disk drive to create said estimate of said flying height.

4. The method of claim 1, further comprising the step:
   controlling said flying height of said read-write head in said slider near said rotating disk surface comprising the step:
   adjusting a vertical actuation signal to a micro-actuator assembly coupled to said slider based upon said estimate of said flying height;
   wherein said micro-actuator assembly stimulated by said vertical actuation signal acts upon said slider to at least partly control said flying height.

5. The method of claim 4, wherein said micro-actuator assembly uses a piezoelectric effect to act upon said slider when stimulated by said vertical actuation signal.

6. The method of claim 4, wherein said micro-actuator assembly uses an electrostatic effect to act upon said slider when stimulated by said vertical actuation signal.

7. An embedded circuit for at least partly implementing the method of claim 4, comprising:
   means for adjusting said vertical actuation signal to said micro-actuator assembly coupled to said slider based upon said estimate of said flying height, comprises one member of a group consisting essentially of:
a voltage source driven by a voltage control signal to, at least partly, create said vertical actuation signal; and
a current source driven by a current control signal to, at least partly, create said vertical actuation signal.

8. The embedded circuit of claim 7, wherein the means for adjusting, further comprises one member of the group consisting essentially of:
a digital vertical control signal driving a first Digital to Analog Converter (DAC) at least partly generating said voltage control signal; and
said digital vertical control signal driving a second DAC at least partly generating said current control signal.

9. The embedded circuit of claim 8, wherein the means for adjusting, further comprises one of the group consisting essentially of:
a first filter electrically coupled to a first output of said first DAC to create said voltage control signal; and
a second filter electrically coupled to a second output of said second DAC to create said current control signal.

10. The embedded circuit of claim 8, further comprising: a servo controller providing said digital vertical control signal.

11. The embedded circuit of claim 10, wherein said servo controller further providing said digital vertical control signal based upon said estimate of said flying height.

12. The embedded circuit of claim 11, wherein said servo controller comprises:
a servo computer accessibly coupling a servo memory containing at least one program step included in a servo program system;
wherein said servo program system comprises the program steps:
converting said potential difference measurement to create said estimate of said flying height of said read-write head; and
adjusting said vertical actuation signal to said micro-actuator assembly based upon said estimate of said flying height.

13. The embedded circuit of claim 11, wherein said servo computer receives said potential difference measurement from a means for sensing said leakage current between said slider and said spindle motor.

14. The embedded circuit of claim 7, wherein the means for adjusting, further comprises:
means for adjusting said vertical actuation signal to said micro-actuator assembly coupled to said slider based upon said estimate of said flying height and based upon an estimate of an ambient temperature in said hard disk drive.

15. The embedded circuit of claim 14, wherein the means for adjusting, further comprises:
means for adjusting said vertical actuation signal to said micro-actuator assembly coupled to said slider based upon said estimate of said flying height and based upon said estimate of said ambient temperature and based upon an estimate of an air pressure within said hard disk drive.

16. An embedded circuit implementing the method of claim 4, comprising:
a servo computer accessibly coupling a servo memory containing at least one program step included in a servo program system;
said servo computer communicatively coupling to an analog to digital converter sensing a potential difference across a resistor to create said potential difference measurement in said servo memory;
said resistor for electrically coupling to said slider and to said spindle motor electrically coupling through said spindle to said rotating disk surface; and
wherein said apparatus, further comprises: one member of the group consisting essentially of:
said servo computer providing a digital vertical control signal driving a digital control voltage source to create said vertical actuation signal; and
said servo computer providing said digital vertical control signal driving a digital control current source to create said vertical actuation signal;
wherein said servo program system comprises the program steps:
converting said potential difference measurement to create said estimate of said flying height; and
adjusting said digital vertical control signal based upon said estimate of said flying height.

17. The embedded circuit of claim 16,
wherein said digital control voltage source, comprises:
a first Digital to Analog Converter (DAC) driven by said digital vertical control signal to, at least partly, create a voltage control signal presented to a voltage source to, at least partly, create said vertical actuation signal; and
wherein said digital control current source, comprises:
a second DAC driven by said digital vertical control signal to, at least partly, create a current control signal presented to a current source to, at least partly, create said vertical actuation signal.

18. The embedded circuit of claim 17,
wherein said digital control voltage source, comprises:
said first DAC creating a first output presented to a first filter to, at least partly, create said voltage control signal presented to said voltage source; and
wherein said digital control current source, comprises:
said second DAC creating a second output presented to a second filter to, at least partly, create said current control signal presented to said current source.

19. The embedded circuit of claim 16, wherein said servo computer includes at least one instruction processor and at least one data processor; wherein at least one of said instruction processors directs the actions of said data processor, for each of said data processors.

20. An embedded circuit for implementing the method of claim 1, comprising:
means for sensing said leakage current between said slider and said spindle motor electrically coupling through said spindle to said rotating disk surface to create said potential difference measurement; and
means for converting said potential difference measurement to create said estimate of said flying height of said read-write head near said rotating disk surface;
wherein the means for sensing, comprises:
a resistor coupling between said slider and said spindle motor to create a leakage current path: and
an analog to digital converter coupling across said resistor to create said potential difference measurement as a potential difference.

21. The embedded circuit of claim 20, wherein said potential difference is at least one micro-volt.

22. The embedded circuit of claim 20, wherein said resistor has a resistance of at least one mega-ohm.

23. The embedded circuit of claim 20, wherein the means for converting, comprises:
means for converting said potential difference measurement based upon a resistance of said resistor.

24. The embedded circuit of claim 20, wherein the means for converting, comprises at least one of:
- a finite state machine;
- a servo computer accessibly coupling a servo memory containing at least one program step included in a servo program system; and
- an inferential engine.

25. The embedded circuit of claim 24,
wherein said finite state machine receives said potential difference measurement to create said estimate of said flying height;
wherein said servo computer receives said potential difference measurement to create said estimate of said flying height; and
wherein said inferential engine uses said potential difference measurement to infer said estimate of said flying height.

26. The hard disk drive, comprising: said embedded circuit of claim 20, further comprising said means for sensing electrically coupled to said slider and to said spindle motor to provide said potential difference measurement.

27. The hard disk drive of claim 26, wherein said spindle motor is mounted on a disk base.

28. The hard disk drive of claim 26, wherein said spindle motor is embedded in a disk base.

* * * * *